(12) United States Patent
Thornton

(10) Patent No.: US 6,264,144 B1
(45) Date of Patent: Jul. 24, 2001

(54) MATERIAL ASSEMBLY FOR AN INFLATABLE AERODYNAMIC BRAKING DEVICE FOR SPACECRAFT DECELERATION AND THE LIKE

(75) Inventor: Janine M. Thornton, Eliszabeth, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/520,533

(22) Filed: Mar. 8, 2000

Related U.S. Application Data

(60) Provisional application No. 60/146,926, filed on Aug. 3, 1999.

(51) Int. Cl.[7] ................................................ B64G 1/14
(52) U.S. Cl. ................. 244/160; 244/158 A; 244/113
(58) Field of Search .......................... 244/158 R, 158 A, 244/160, 113; 428/920, 902, 408, 422, 433, 436

(56) References Cited

U.S. PATENT DOCUMENTS

| | | | |
|---|---|---|---|
| 3,286,951 | * | 11/1966 | Kendall . |
| 3,508,724 | * | 4/1970 | Scher et al. . |
| 4,504,031 | | 3/1985 | Andrews ............................... 244/113 |
| 4,518,137 | | 5/1985 | Andrews ............................... 244/113 |
| 4,832,288 | * | 5/1989 | Kendall et al. . |
| 4,903,918 | * | 2/1990 | Park et al. . |
| 5,038,693 | | 8/1991 | Kourtides et al. ................... 112/440 |
| 5,080,306 | * | 1/1992 | Porter et al. . |
| 5,863,068 | * | 1/1999 | Breed . |

OTHER PUBLICATIONS

Johnsen, Katherine. "Canadian Report Urges Domestic Comcast." Aviation Week and Space Technology, Mar. 1967.*

* cited by examiner

Primary Examiner—Charles T. Jordan
Assistant Examiner—Tien Dinh
(74) Attorney, Agent, or Firm—Louis L. Dachs

(57) ABSTRACT

The invention is a material for use in an inflatable aerodynamic braking device for a spacecraft. In detail, the invention includes a plurality of high temperature resistant barrier outer layers. Preferably, the outer layer is made of Aluminoborosilicate fabric. At least one carbon cloth layer is disposed behind said outer layers. A plurality of thermal radiation barrier intermediate layers are disposed behind the at least one carbon cloth layer. The intermediate layers include a plurality of metal foil layers, at least one additional carbon cloth layer interspersed between the metal foil layers. A plurality of metal-coated polymeric layers are disposed behind the metal foil layers, preferably a polyimide fabric coated with Aluminum. The metal foil layers are Aluminum and Titanium. At least one inflatable gas barrier interior layer is disposed behind the intermediate layers, preferably made of a polyimide material. The outer, intermediate and interior layers are sewn together by high temperature resistant thread, preferably Silicon Carbide thread.

8 Claims, 4 Drawing Sheets

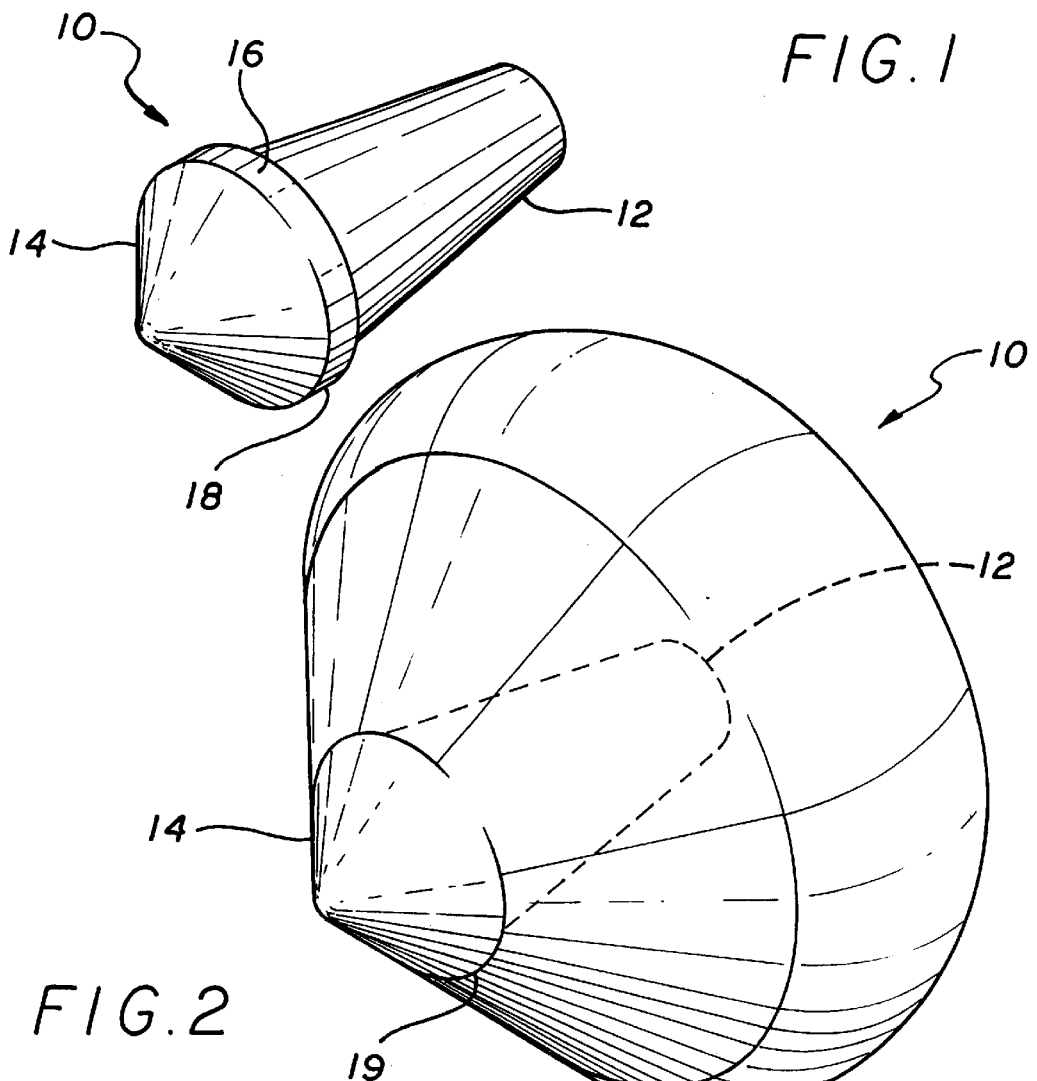
FIG.1
FIG.2
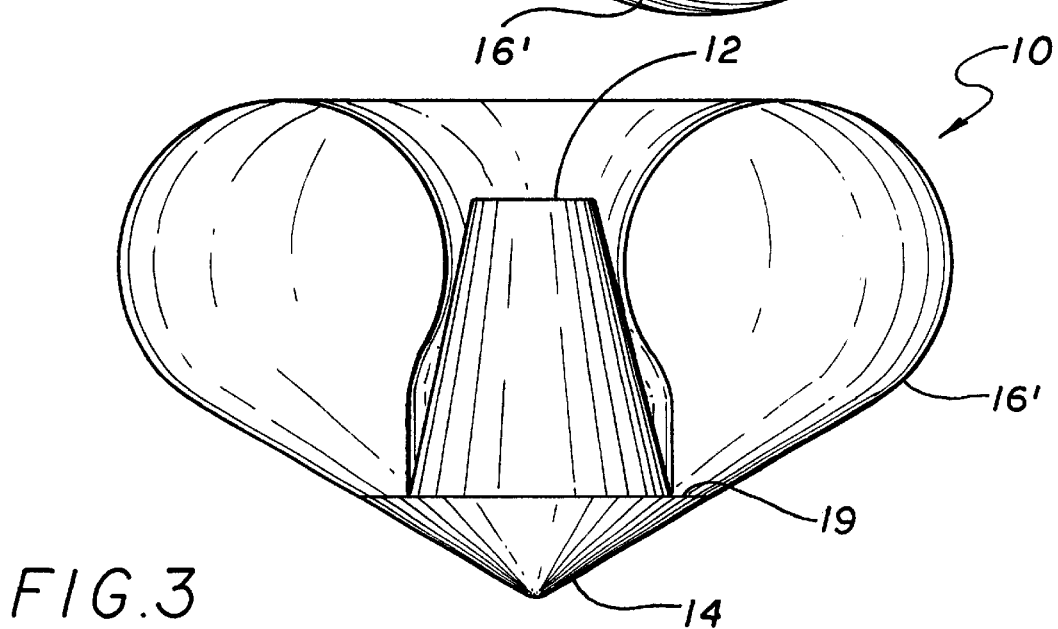
FIG.3

FIG. 6
DEVICE 16 MATERIAL ASSEMBLY

| NUMERICAL DESIGNATION | DEVICE 16 MATERIAL LAYUP | DESCRIPTION |
|---|---|---|
| 23A, 23B | OUTER MOLD LINE - 2 PLIES | NEXTEL;312;ALUMINOBOROSILICATE STYLE:AF-12,7.9 OZ/YD2, 0.012 IN.THICK; 1200 DENIER WARP AND FILL; 5 HARNESS SATIN WEAVE |
| 25 | CARBON CLOTH -1 PLY | ZOLTEC PANEX 30 SW08, 8 HARNESS SATIN, 8.5 OZ/YD2, 0.040 THICK |
| 26 | TI METAL FOIL -1 LAYER | COMMERCIALLY PURE (CP), TITANIUM METAL, 0.002 IN. THICK |
| 28 | CARBON CLOTH -1 PLY | SAME AS ABOVE |
| 30, 32, 34 | TI METAL FOIL -3 LAYERS | SAME AS ABOVE |
| 36, 38, 40, 42 | AL METAL FOIL -4 LAYERS | ALUMINUM ALLOY 1145 (99.45% AL, MIN.), 0.005 IN. THICK |
| 44 | METALLIZED (AL) POLYIMIDE (KAPTON™) -1 LAYER | ONE-SIDE ALUMINIZED POLYIMIDE, 0.002 IN. TOTAL THICKNESS; METALLIZED ON BOTH SIDES |
| 46 - 56 | METALLIZED (AL) POLYIMIDE (KAPTON™) -1 LAYER | ONE-SIDE ALUMINIZED POLYIMIDE, 0.003 IN. TOTAL THICKNESS; METALLIZED ON BOTH SIDES |
| 58 | METALLIZED (AL) POLYIMIDE (KAPTON™) -1 LAYER | ONE-SIDE ALUMINIZED POLYIMIDE, 0.002 IN. TOTAL THICKNESS; METALLIZED ON BOTH SIDES |
| 60 | POLYIMIDE (KAPTON™) -1 LAYER | INFLATABLE BLADDER, POLYIMIDE, 0.005 IN. THICK |

MATERIAL ASSEMBLY FOR AN INFLATABLE AERODYNAMIC BRAKING DEVICE FOR SPACECRAFT DECELERATION AND THE LIKE

UNITED STATES PRIORITY PRIORITY APPLICATIONS

This application is a continuation-in-part of co-pending Provisional Applications Serial No. 60/146,926 High Temperature Capable Ballute For Spacecraft Deceleration, filed Aug. 3, 1999

BACKGROUND OF THE INVENTION

1. Field of the Invention

The invention relates to the field of spacecraft and, in particular, to an improved ballute for decelerating the spacecraft such that it can be placed in orbit about an extraterrestrial planet or for actual reentry into the planet's atmosphere.

2. Description of Related Art

Deceleration of spacecraft for planetary orbit or re-entry into the planet's atmosphere creates severe temperature and pressure loads on the spacecraft. The space shuttle uses ceramic tiles, which provide excellent protection. It is especially suited for vehicles that are reusable, even though extensive maintenance procedures are required. Other single reentry spacecraft such as planetary probes have successfully employed heat shields made of ablative materials, while others have used metal heat shields. However, such systems impact the size and weight of a reentry vehicle. All are critical on spacecraft to be used for interplanetary exploration. Both directly impact size (and therefore cost) of the launch vehicle required to place a payload into orbit or to send the spacecraft to another planet.

Inflatable aerodynamic braking devices, commonly called ballutes, which have been in existence for a long time, offer a serious alternative. They have the advantage of being storable in a relatively small volume and, when inflated, can be expanded to a size many times in size. U.S. Pat. No. 4,504,031 "Aerodynamic Braking And Recovery For A Space Vehicle" and U.S. Pat. No. 4,518,137 "Aerodynamic Braking System For A Space Vehicle" both by D. G. Andrews disclose an inflatable braking device, which in the stored condition is mounted on the aft end of the spacecraft about a rocket nozzle. When deployed it produced a large aerodynamic braking surface. The rocket engine exhaust during braking provides a cooling layer of gas forward of the braking device such that it does not overheat. This will allow the spacecraft to enter a low earth orbit. However, it depends upon the use of a rocket engine to provide protective cooling gases. It would be unsuitable for a ballistic type reentry into the atmosphere required for landing the spacecraft on the planet's surface. This is primarily due to the high heat loads that would be introduced into the rocket engine as the spacecraft descended into the denser atmosphere. In fact, ballutes are generally designed for slowing a spacecraft into orbit about a planet, not for descent to the planet's surface. Heretofore the prior art ballute designs did not accommodate such a reentry. However, at least they offer a reduction in size and weight of the spacecraft when used in combination with a more conventional aerodynamic breaking device such as an ablative heat shield.

High temperature ceramic thermal blanks have proven useful on spacecraft. For example, fibrous silica bafting sandwiched between silica fabric and glass fabric. More recently, multi-layer materials have proven useful. For example, U.S. Pat. No. 5,038,693 "Composite Flexible Blanket" by D. A. Kourtides, et al. discloses a multi-layer insulation blanket. It comprises outer layers of Aluminoborosilicate (ABS), with Aluminum and Stainless Steel foils reflective layers there-be-hind. Spacers made of ABS or polyimide scrim were placed between the metal foils. An alternate approach used metal-coated polyimide cloth instead of metal foils. The various layers were sewn together with Silicon Carbide thread. Various combinations and numbers of layers were tested; all of which proved successful. If metal foils were used, a layer of ABS was inserted therebetween. If metal-coated polyimides were used they were aligned such that the metalized side contacted the polyimide side of the next layer. However, such insulation was not designed to be used in an inflatable structure. First of all, there is no specific gasbag layer. Inflatable aerodynamic braking devices or ballutes must be internally pressurized during reentry to maintain the aerodynamic shape. In addition, they must be flexible enough to store in a compact shape and expand to a comparably large aerodynamic shape. Also, they must be able to retain their physical shape and not grossly deform during entry/reentry, which would change its drag characteristics.

Thus, it is a primary object of the invention to provide an improved material for an aerodynamic braking device for a spacecraft.

It is another primary object of the invention to provide an improved material for an inflatable aerodynamic braking device for a spacecraft that allows the braking device to be stored in a small volume and which can be expanded to provide a large aerodynamic braking surface.

SUMMARY OF THE INVENTION

The invention is a material for use in an inflatable aerodynamic braking device for a spacecraft. In detail, the invention includes a plurality of high temperature resistant barrier outer layers. Preferably, the outer layer is made of Aluminoborosilicate fabric. At least one carbon cloth layer is disposed behind said outer layers. A plurality of thermal radiation barrier intermediate layers are disposed behind the at least one carbon cloth layer. The intermediate layers include a plurality of metal foil layers, at least one additional carbon cloth layer interspersed between the metal foil layers. A plurality of metal-coated polymeric layers is disposed behind the metal foil layers, preferably a polyimide fabric coated with Aluminum. The metal foil layers are Aluminum and Titanium. At least one inflatable gas barrier interior layer is disposed behind the intermediate layers, preferably made of a polyimide material. The outer, intermediate and interior layers are sewn together by high temperature resistant thread, preferably Silicon Carbide thread.

The novel features which are believed to be characteristic of the invention, both as to its organization and method of operation, together with further objects and advantages thereof, will be better understood from the following description in connection with the accompanying drawings in which the presently preferred embodiment is of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 1 is a perspective view of a spacecraft designed for re-entry into a planetary atmosphere.

FIG. 2 is a perspective view of the spacecraft shown in FIG. 1 with the inflatable aerodynamic breaking device inflated.

FIG. 3 is a cross-sectional view of the spacecraft shown in FIG. 2.

FIG. 6 is a table summarizing the number and type of layers of a preferred material assembly for the braking device.

DESCRIPTION OF THE PREFERRED EMBODIMENT

Figure 4:
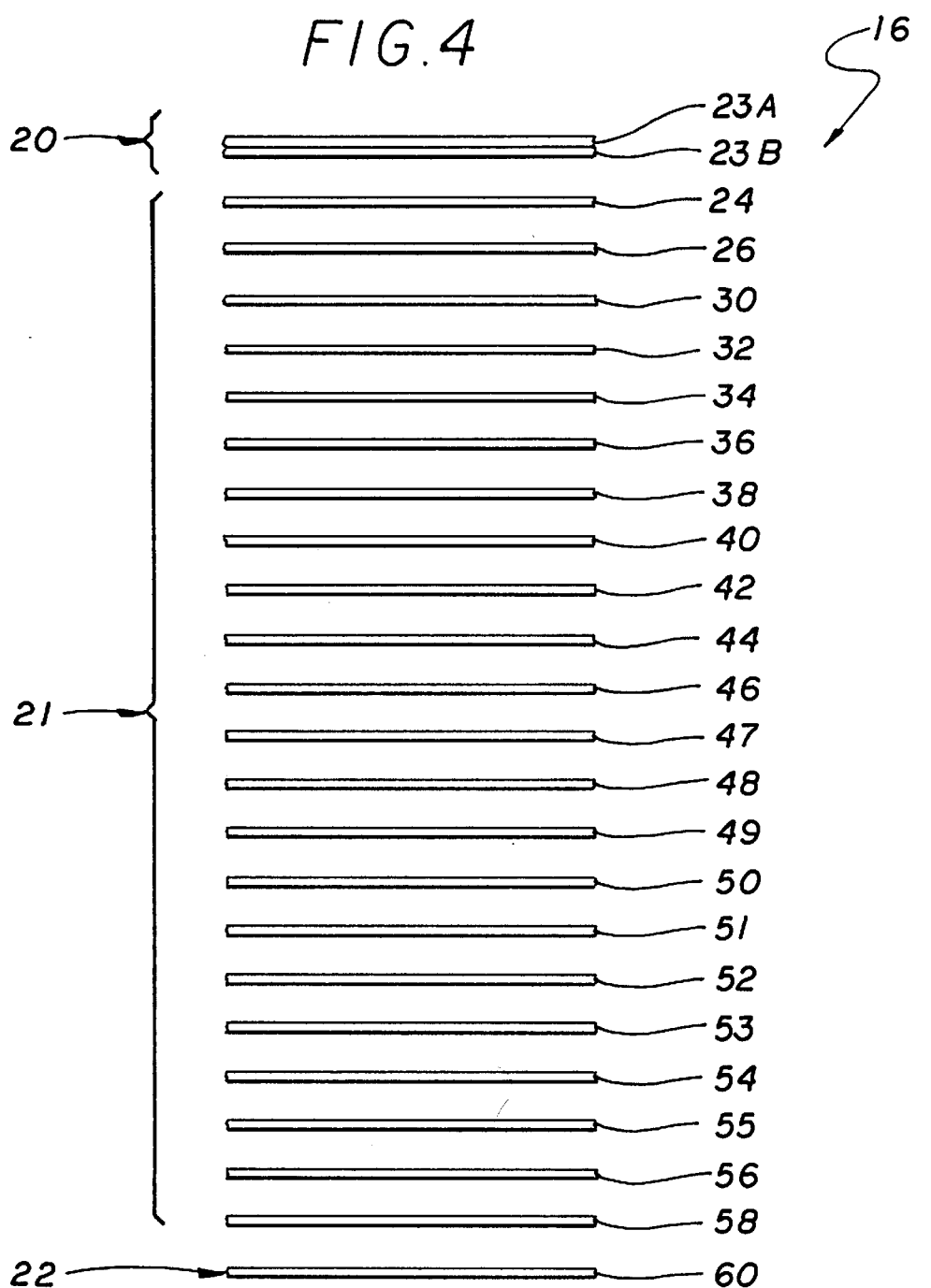
FIG. 4 is an exploded partial cross-sectional view of the breaking device shown in FIG. 3 illustrating the construction thereof.

Referring to FIGS. 1, the spacecraft, generally indicated by numeral 10, includes a payload section 12, heat shield 14 and an inflatable aerodynamic braking device 16 illustrated in the stored or collapsed condition secured with a releasable band 18. In FIGS. 2 and 3, the braking device is illustrated in the inflated condition and indicated by numeral 16', with the band 18 released therefrom. The retention band 18, for example, could be a simple band secured by explosively actuated bolts (not shown). The device 16' forms a smooth extension of the heat shield 14 at the interface 19. The placement during storage, method of inflation, and retention method are not deemed critical to the invention and will not be discussed in further detail.

Figure 5:
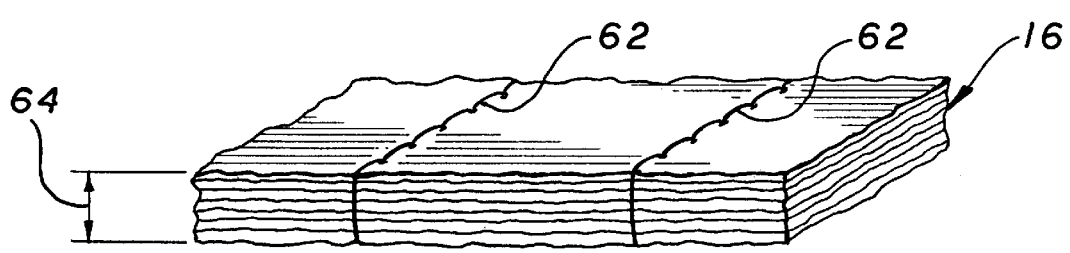
FIG. 5 is a partial view of the device illustrated in FIG. 3.

Referring now to FIGS. 4–6, the device 16 is composed of three main sections: an outer high temperature abrasion resistant portion 20, an intermediate radiation reflection section 21 and a gas barrier section 22. Each of these sections 20, 21, and 22 are composed of one or more layers of material. The outer high temperature abrasion resistant portion 20 typically includes one or two plies of Aluminoborosilicate 23A and 23B. For example NEXTEL®, Style AF-12, 7.9 oz/sq.yd., 0.012 inch thick, 1200 denier warp and fill, 5 harness satin weave. Such a material is available from 3-M Ceramic Fiber Products, St. Paul Minn. Aluminoborsilicate provides excellent abrasion resistance and can withstand temperatures of around 2000 degrees C for the time periods of interest during reentry.

The intermediate radiation reflection section 21 comprises a multi-number of plies. Immediately behind the Aluminoborosilicate plies is a carbon cloth ply 25, for example, Zoltex Panex 30 SW08, 8 harness Satin weave, 8.5 oz/sq.yd., 0.040 inch thick. Such material is available from Zoltec Corporation, St. Louis, Mo. The carbon cloth ply 25 acts as a heat sink impeding the heat flow into the remainder of the device. Next is a single ply of commercially pure Titanium metal foil 26, 0.002 inch thick, followed by another ply of carbon cloth 28. Thereafter three more plies of Titanium foil 30, 32 and 34. Preferably, the Titanium plies 30, 32 and 34 are dimpled so that they are substantially spaced from each other. This is necessary because the metal foil plies act as radiation reflectors and to be effective must be spaced from each other. Titanium, while acting as a reflective layer, also has poor heat transfer characteristics, and thus also serves as a heat sink.

Thereafter, four plies 36, 38, 40 and 42 of dimpled Aluminum foil, which also act as reflective layers, are disposed behind the Titanium ply 34. The Aluminum foil is preferably 0.005 inch thick, No. 1145 (99.45% pure Aluminum). A single ply 44 of Aluminum metallized polyimide, 0.002 inch thick, followed by 11 plies 46, 47, 48, 49, 50, 51, 52, 53, 54, 55, 56, of Aluminum metallized polyimide, 0.003 inch thick, followed a single ply 58 of Aluminum metallized polyimide, 0.002 inch thick. All the metalized plies of polyimide are metal-coated side on both sides. However, single side coating may suffice in many applications. The polyimide is preferably manufactured by DuPont High Performance Films, Circleville, Ohio. Finally, the gas barrier layer comprises a single ply 60 of polyimide film, 0.005 inch thick, and acts as a pressurizable bladder, again preferably KAPTON®.

The number of plies will very depending upon the severity of the reentry. However, and material assembly will require: the outer high temperature abrasion resistant portion 20 of one or two plies of Aluminoborosilicate 23A and 23B; the carbon cloth ply 24 therebehind; a plurality of metal foil layers with an additional carbon cloth ply between the metal layers; a plurality of metallized polyimide layers; and the polyimide bladder 60. For example, in the ballute application, this material would be needed in proximity to the heat shield 14. Further out toward the periphery of the device 16, the heating is lower and a less complex material assembly is required.

Because the device 16 is made up of a large number of layers (25 in the example provided); it may be desirable, if not mandatory to stitch the layers together. As illustrated in FIG. 5, this can be accomplished by sewing the layers together with thread, such as one made of Silicon Carbide. A suitable Silicon Carbide thread is disclosed in the previously discussed US Patent U.S. Pat. No. 5,038,693 "Composite Flexible Blanket".

Figure 7:
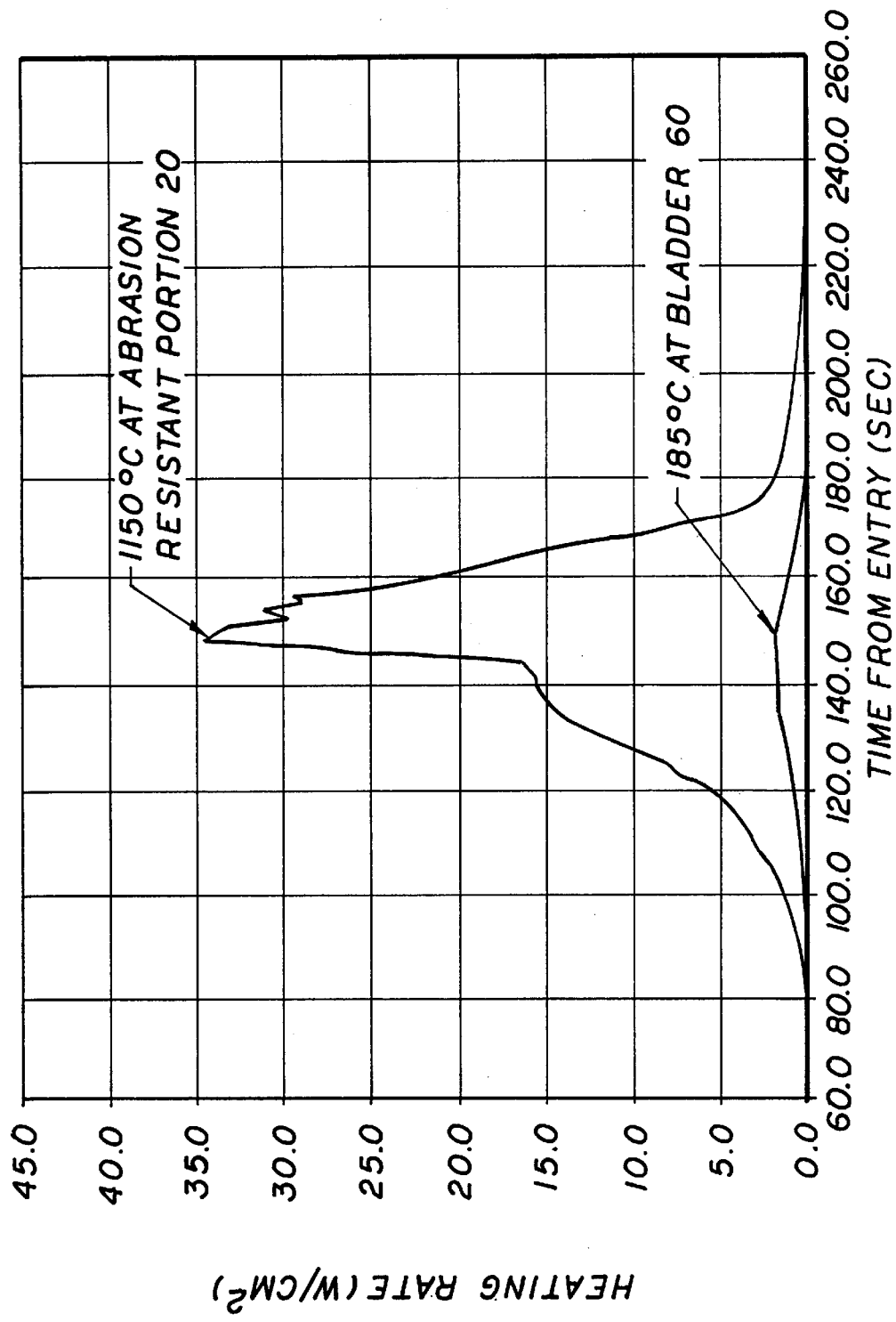
FIG. 7 is a graph of the performance of the material assembly shown in FIG. 4.

Theoretical studies of an entry to the atmosphere of the planet Mars, have indicated that the heating rate on a device 16 for a spacecraft 10 would significant. As summarized in the graph presented in FIG. 7, the subject device 16, while experiencing outer surface temperatures in the 1100 degree C range at the device 16' and heat shield interface 19 with a peak heating rate of 35 w/cm$^2$, would be capable of limiting the temperature at the bladder 60 to less then 200 degrees C.

While the invention has been described with reference to a particular embodiment, it should be understood that the embodiment is merely illustrative, as there are numerous variations and modifications, which may be made by those skilled in the art. Thus, the invention is to be construed as being limited only by the spirit and scope of the appended claims.

INDUSTRIAL APPLICABILITY

The invention has applicability to the spacecraft manufacturing industry.

What is claimed is:

1. A material assembly for use in an inflatable aerodynamic braking device for a spacecraft comprising:

a plurality of high temperature resistant barrier outer layers;

a least one carbon cloth layer disposed behind said outer layers;

a plurality of thermal radiation barrier intermediate layers disposed behind said at least one carbon cloth layer, said intermediate layers comprising:

a plurality of metal foil layers;

at least one additional carbon cloth layer interspersed between said metal foil layers;

a plurality polymeric-layers behind said metal foil layers, said polymeric layers metal coated on at least one side; and at least one inflatable gas barrier interior layer disposed behind said intermediate layers; and said outer, intermediate and interior layers joined together at the periphery.

2. The material assembly as set forth in claim 1 wherein said plurality of high temperature resistant barrier outer layers comprises aluminoborsilicate fabric.

3. The material assembly as set forth in claim 1 wherein said metal foil layers include at least one layer of Aluminum foil.

4. The material assembly as set forth in claim 3 wherein said metal foil layers include at least one layer of Titanium foil.

5. The material assembly as set forth in claim 1 wherein said metal coated polymeric layers are made of an Aluminum coated polyimide layer.

6. The material assembly as set forth in claim 1 wherein said at least one inflatable gas barrier interior layer is a polyimide fabric.

7. The material assembly as set forth in claim 1, or 2, or 3, or 4, or 5, or 6, wherein said outer, intermediate and interior layers joined together at the periphery by a sewn joint.

8. The material assembly as set forth in claim 7, wherein said sewn joint is accomplished using a thread made of Silicon Carbide.

* * * * *